United States Patent [19]
Edwards

[11] 4,022,243
[45] May 10, 1977

[54] FROST PROOF SILLCOCK

[75] Inventor: Robert B. Edwards, Niles, Mich.

[73] Assignee: Nibco, Inc., Elkhart, Ind.

[22] Filed: June 1, 1973

[21] Appl. No.: 366,149

[52] U.S. Cl. .............................. 137/360; 251/216
[51] Int. Cl.² ........................................ F16K 27/10
[58] Field of Search .......... 251/215, 216; 137/360; 285/287

[56] References Cited
UNITED STATES PATENTS

| | | | |
|---|---|---|---|
| 2,039,542 | 5/1936 | Lindquist | 285/287 X |
| 2,652,224 | 9/1953 | Noland | 137/360 |
| 2,870,780 | 1/1959 | Fladung | 137/360 |
| 3,267,956 | 8/1966 | Kline | 137/360 |
| 3,455,581 | 7/1969 | Politz | 285/287 |

Primary Examiner—Alan Cohan
Attorney, Agent, or Firm—Marmaduke A. Hobbs

[57] ABSTRACT

A frost proof sillcock having an outer section with a fluid chamber therein and a discharge opening, a round tubular body connected to the external section and communicating with the chamber, and a seat end section of substantially the same diameter as the tubular body connected integrally with the body to form a substantially even external surface between the body and the section. The seat end section contains a valve seat and a plurality of thread segments, and a stem extends through the chamber in the external section and through the body, and contains a valve element on the inner end thereof for seating on the seat. A hand wheel for rotating the stem to seat and unseat the valve element is secured to the outer end of the stem.

6 Claims, 5 Drawing Figures

U.S. Patent    May 10, 1977    4,022,243
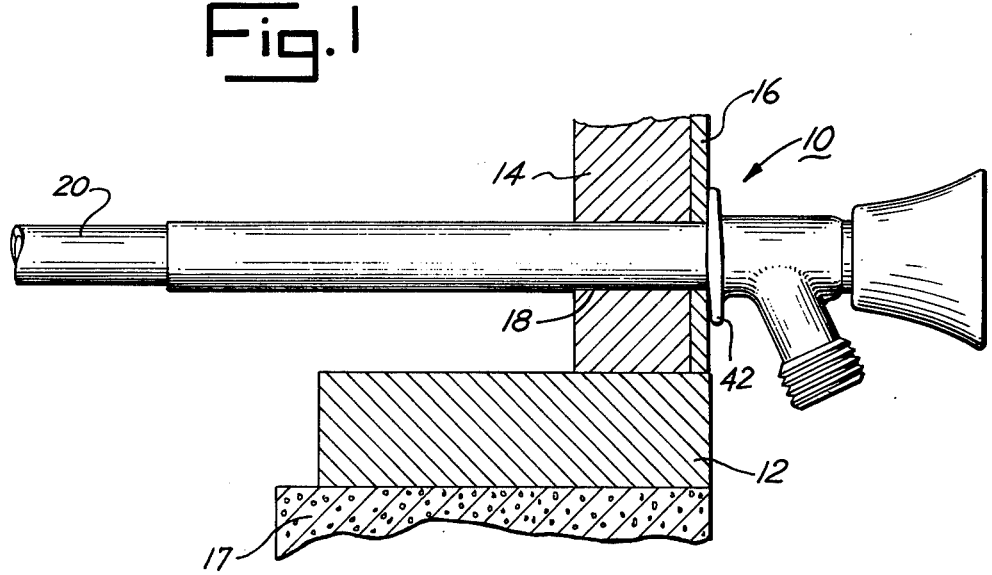
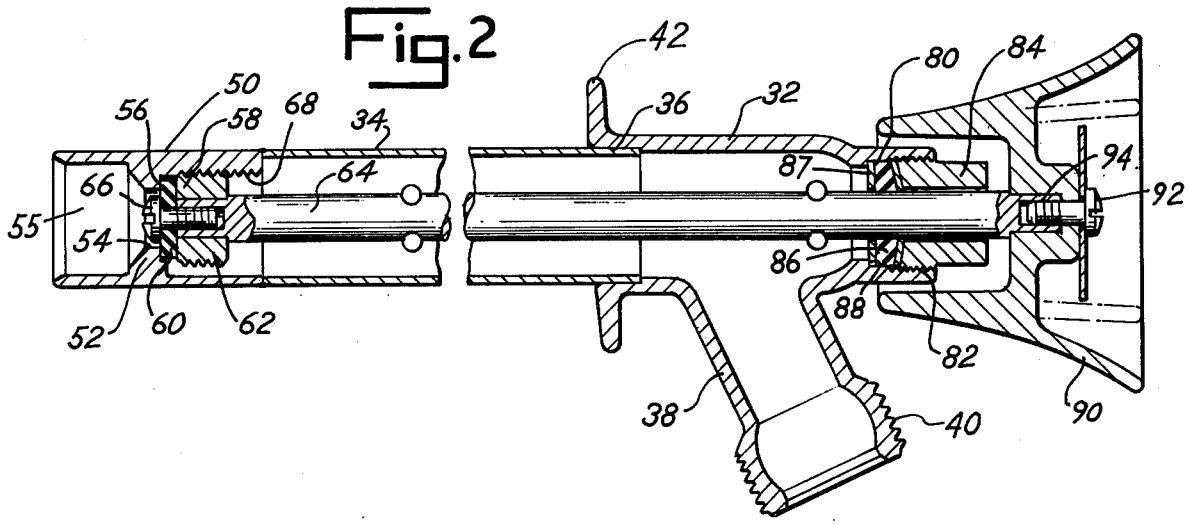
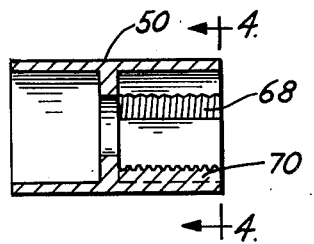
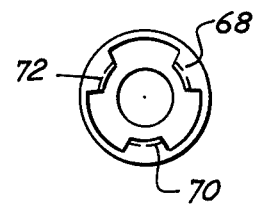
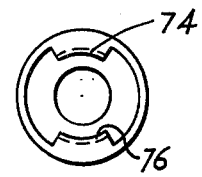

FROST PROOF SILLCOCK

Frost proof sillcocks are used in geographic areas where freezing temperatures are encountered and are so designed that the valve seat is inside the building and thus cuts off the flow of water in an area which is not subjected to freezing temperatures. The hand wheel and hose coupling end of the sillcock are on the outside of the building and, in a proper installation, the body is tipped slightly downwardly toward the outside and the coupling end is positioned downwardly, so that water in the body of the sillcock will effectively drain from the sillcock and thereby avoid damage to the sillcock from freezing water. The conventional frost proof sillcock has an elongated tubular body and a valve seat end consisting of a casting or forging which is secured to the inner end of the body and is appreciably larger in diameter than the tubular body. As a result of the enlarged valve seat end, the sillcock is normally installed by drilling a hole through the wall of the building substantially larger than the tubular body in order to insert the valve seat end through the wall. This enlarged hole sometimes interferes with securing the sillcock in place in the wall, usually with screws extending through an external flange into the wall on either side of the hole. Further, since the valve seat end of the conventional sillcock is a casting or forging secured to the tubular body by means of soft soldering, silver brazing or some mechanical means, the joint between the body and the seat end is relatively weak and occasionally develops leaks resulting from the method used in installing the sillcock, and from usage thereafter. It is therefore one of the principal objects of the present invention to provide a frost proof sillcock which has a valve seat end or section of a diameter substantially the same as that of the tubular body, and which can be installed by merely drilling a hole in the wall of a diameter only slightly larger than the diameter of the tubular body, thus permitting the sillcock to be firmly secured in place with the flange effectively covering the wall hole.

Another object of the invention is to provide a sillcock of the aforesaid type which is less likely to develop leaks or otherwise become defective during usage than the conventional valve of this type, and whic is more reliable and sturdy and more economical to produce.

Still another object of the invention is to provide a frost proof sillcock which is simple in construction and operation and easy to install, and which can be readily fabricated using well known manufacturing practices and procedures.

Further objects and advantages of the present invention will become apparent from following description and accompanying drawing, wherein:

FIG. 1 is a vertical cross sectional view through the sill of a building showing the present sillcock installed therein and connected to a water pipe;

FIG. 2 is an enlarged longitudinal cross sectional view through the sillcock shown in FIG. 1;

FIG. 3 is an enlarged cross sectional view of the valve seat end, showing the end removed from the valve and the valve element removed therefrom;

FIG. 4 is an end elevational view of the seat end shown in FIG. 3; and

FIG. 5 is an end elevational view similar to that shown in FIG. 4, illustrating a modified form of the seat end.

Referring more specifically to the drawing, and to FIG. 1 in particular, numeral 10 indicates generally a sillcock embodying the present invention and showing it installed in a sill of a building, such as a residence sill, consisting of a base plate 12, sill member 14 and siding 16 secured to member 14, the base plate 12 resting on and being secured to foundation 17. A hole 18 for receiving the sillcock is bored through siding 16 and sill member 14, and the inner end of the sillcock is connected to a water pipe 20 of the building water system.

The sillcock embodying the present invention consists of an external or hose section 32 and a round tubular body section 34 connected to the outer section 32. The outer section is preferably a casting of brass or other suitable metal, and the tubular body is a copper tube extending into and being soldered in a cup 36 in the inner end of section 32. The latter section is provided with an outlet 38 having a threaded portion 40 for receiving the coupling of a hose. The two sections 32 and 34, when joined, form a rigid unit, and section 32 is provided with a flange 42 for securing the sillcock firmly in place in hole 18 in the wall with the use of screws extending through the flange into the wall.

In the present sillcock, a valve seat end section 50 is secured to the inner end of tubular section 34 and contains an inwardly extending flange 52 which defines an opening 54 connecting the passage in tubular body 34 with cup 55, the cup being adapted to receive the end of the water pipe for forming a soldered or brazed joint therebetween. An annular valve seat 56 is disposed on the posterior side of flange 52 defining opening 54 and is adapted to be engaged by the valve element 58 when the sillcock is closed. The valve element includes a disc 60 secured to a disc holder 62 and stem 64 by a screw 66 extending inwardly into a threaded hole in the end of the stem. The disc holder has threads on the external surface for intermeshing with threaded segments 68, 70 and 72 on the inner wall of the valve seat end. While three threaded sections are illustrated in FIG. 4, only two, such as illustrated in FIG. 5, at numerals 74 and 76, may be used if desired.

One of the important features of the present invention is the use of a valve seat end of substantially the same external diameter as the external diameter of tubular body 34. In the embodiment illustrated in the drawings, the seat end is fabricated from bar stock, for example, and machined to provide flange 52, cup 55, threaded sections 68, 70 and 72 and valve seat 56. The seat end is secured to the end of tubular body 34 by electric welding which, in effect, forms a continuous wall from tubular section 34 to and through the adjacent section of the seat end. When the weld has been completed, a substantially smooth joint surface is provided, uninterrupted by any shoulders, grooves or ribs in the area in which the joint is made. Once the seat end has been joined to the end of tubular body 34, it remains permanently attached thereto and is adapted to receive disc holder 62 when stem 64 is inserted in body 34 through opening 80 in the outer end of hose section 32.

The wall of the opening 80 is threaded as indicated at numeral 82 for receiving packing nut 84 which engages packing 86 to form a seal between the wall and the external surface of stem 64. A packing washer 87 seated on an annular shoulder 88 in the wall forms an effective abutment for the packing material as packing nut 84 is threaded inwardly into opening 80. A hand wheel 90 for rotating stem 64 is secured to the outer end of the stem by a screw 92 extending inwardly into a threaded opening 94 in the end of the stem so that the hand wheel and stem turn together to rotate disc holder 62 inwardly and outwardly toward and away from valve seat 56, as the sillcock is closed and opened.

In the installation and operation of the present sillcock, a hold 18 of a diameter only slightly larger than the diameter of body 34, is bored through sill member 14 and siding 16, and seat end 50 and body 34 are inserted in the hold to connect the seat end with water pipe 20. After the sillcock has been oriented to place the hose connection downwardly, the pipe 20 and end 50 are connected by soldering, and flange 42 is seated firmly against the outer surface of siding 16 and secured thereto by screws extending through holes in the flange into the siding and preferably into sill member 14, thus firmly holding the sillcock in its proper position. Rotation of wheel 90 in one direction causes the screw threads on the external surface of disc holder 62 to unseat disc 69 from valve seat 56, and rotation in the opposite direction to seat the disc firmly on the valve seat. Since the hose connection extends downwardly, any water in body 34 can readily drain therefrom, thus draining the sillcock of any water which could be in an area that might fall below freezing.

With the use of the sillcock embodying the present invention, a more convenient an reliable installation can be made, in that the one installing the sillcock needs merely to use a bit of the next size larger than the diameter of body 34, thus leaving a substantial area of the wall immediately around the body and adjacent flange 42 for supporting the sillcock and receiving the screws extending through flange 42. In addition to the convenience and reliability of the installation, the electrically welded joint between tubular body 34 and seat end 50 is substantially more durable and dependable than the conventional soldered or brazed joint, which normally involves the use of a seat end appreciably larger in diameter than body 34, thus requiring a wall hole appreciably larger than the body.

While only one embodiment of the present sillcock has been described in detail herein, various changes and modifications may be made without departing from the scope of the invention.

I claim:
1. A frost proof sillcock comprising an external section having a fluid chamber therein and a discharge opening, and round tubular body connected at one end to said external section and communicating with said chamber, a cylindrical seat end section connected to the other end of said tubular body and having a cup with smooth inner and outer surfaces for a soldered or brazed pipe joint, said seat end section being joined integrally with said body to form a metal joint therebetween having a substantially higher melting point than a soldered or brazed joint in said cup and containing an internal flange having an opening therethrough, and a valve seat on said flange in axial alignment with said tubular body, and said seat end section further having the same external diameter as said tubular body and being joined to the end surface of said body of electric weld to form a smooth, continuous surface between said body and end section.

2. A frost proof sillcock as defined in claim 1 in which said seat end section includes an internal wall having a plurality of thread segments thereon, a stem extending axially through said body, a valve element secured to the inner end of said stem and hving threads thereon for engaging the threads on said end section.

3. A frost proof sillcock as defined in claim 2 in which said stem extends through the chamber in said external section and outwardly therefrom, and a hand wheel on the outer end of said stem for rotating said stem to seat and unseat said valve element.

4. A frost proof sillcock as defined in claim 1 in which said external section is provided with a flange on its inner edge for engaging a wall surface, and having a threaded external surface for receiving a hose coupling around said discharge opening.

5. A frost proof sillcock as defined in claim 3 in which said external section is provided with a flange on its inner edge for engaging a wall surface, and having a threaded external surface for receiving a hose coupling around said discharge opening.

6. A frost proof sillcock as defined in claim 1 in which said seat end section is provided with a cup for receiving the end of a water pipe, said cup communicating through said end section with said tubular body.

* * * * *